United States Patent
Kim

(10) Patent No.: US 7,184,234 B2
(45) Date of Patent: Feb. 27, 2007

(54) COMPENSATION FOR JITTER IN SERVO SIGNAL WITHIN DATA STORAGE DEVICE

(75) Inventor: Jae-Hyeong Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/051,859

(22) Filed: Feb. 4, 2005

(65) Prior Publication Data
US 2005/0174672 A1 Aug. 11, 2005

(30) Foreign Application Priority Data
Feb. 6, 2004 (KR) .................. 10-2004-0007825

(51) Int. Cl.
G11B 5/02 (2006.01)
(52) U.S. Cl. ........................................... 360/51
(58) Field of Classification Search ............ 360/51, 360/48, 17, 70, 15, 77.04, 78.04; 369/53.19
See application file for complete search history.

(56) References Cited

U.S. PATENT DOCUMENTS

| | | | | |
|---|---|---|---|---|
| 4,608,610 A | * | 8/1986 | Tatsuguchi | 386/15 |
| 5,959,799 A | * | 9/1999 | Deoka | 360/70 |
| 6,069,764 A | | 5/2000 | Morris et al. | 360/77.04 |
| 6,377,417 B1 | | 4/2002 | Ahn | 360/77.04 |
| 6,437,936 B1 | | 8/2002 | Chen et al. | 360/77.04 |
| 6,587,293 B1 | * | 7/2003 | Ding et al. | 360/51 |
| 6,643,082 B1 | * | 11/2003 | Belser | 360/48 |
| 6,710,957 B2 | * | 3/2004 | Nakasato | 360/51 |
| 6,724,562 B1 | * | 4/2004 | Ang et al. | 360/78.04 |
| 6,738,205 B1 | * | 5/2004 | Moran et al. | 360/17 |
| 6,775,083 B2 | * | 8/2004 | Hilla et al. | 360/51 |
| 6,842,414 B1 | * | 1/2005 | Park | 369/53.19 |
| 2002/0093754 A1 | * | 7/2002 | Zhang et al. | 360/77.04 |
| 2003/0227845 A1 | * | 12/2003 | Park et al. | 369/53.19 |

OTHER PUBLICATIONS

Japanese Patent Application No. 2001-318501 to Norio, having Publication date of Apr. 25, 2003 (w/English Abstract page).
Japanese Patent Application No. 10-203094 to Toru, having Publication date of Feb. 2, 2000 (w/ English Abstract page).
Korean Patent Application No. 1020010035106 to Cho et al., having Publication date of Dec. 31, 2002 (w/ English Abstract page).

* cited by examiner

*Primary Examiner*—Fred F. Tzeng
(74) *Attorney, Agent, or Firm*—Monica H. Choi

(57) ABSTRACT

For compensating for jitter within a data storage device in real time, a jitter amount is determined from timings of servo signals for sectors of the data storage device. A timing of a servo gate pulse is adjusted for accessing another sector depending on the jitter amount. Such a jitter amount depends on the eccentricity of a disc having the sectors within the data storage device.

20 Claims, 10 Drawing Sheets

COMPENSATION FOR JITTER IN SERVO SIGNAL WITHIN DATA STORAGE DEVICE

BACKGROUND OF THE INVENTION

This application claims priority to Korean Patent Application No. 2004-7825, filed on Feb. 6, 2004, in the Korean Intellectual Property Office, the disclosure of which is incorporated herein in its entirety by reference.

1. Field of the Invention

The present invention relates generally to data storage devices such as HDDs (hard disc drives), and more particularly, to compensating for jitter in servo signals by adjusting a start time of a servo gate pulse in real time.

2. Description of the Related Art

Conventional art related to the present invention is disclosed in U.S. Pat. No. 6,069,764 and Japanese Patent Publication No. 2000-036164. U.S. Pat. No. 6,069,764 provides a technology that compensates for repeatable run out (RRO) errors by determining RRO values in time domain and injecting the RRO values into a servo loop. Japanese Patent Publication No. 2000-036164 provides a technology that outputs and stores a standard run-out correction coefficient, and generates a precise position error signal using the coefficient.

A hard disk drive (HDD) is an example data storage device within a computer system that reproduces data from disks or writes data onto the disks using magnetic heads. Higher data capacity, higher data density, and smaller size of the HDD result in higher bits per inch (BPI) and higher tracks per inch (TPI). BPI indicates recording density in a rotation direction of a disk, and TPI indicates recording density in a radial direction of a disk.

Such higher recording density results in higher number of tracks. More time is spent for recording servo information onto disks with such higher number of tracks during manufacturing the HDD.

For avoiding such time consumption, an offline servo track write (offline STW) method is used for loading a disk containing servo information into a HDD. In this method, writing the servo information onto the disk within the HDD is omitted. Rather, the disk having the servo information written in advance thereon is loaded into the HDD.

Generally, the servo information is written around the tracks of a disk 12. Referring to FIG. 1A, solid circular lines 100 indicate the tracks around the disk 12 about a center point O. However, such a center point O may not be aligned with a center O' of the spindle motor of the HDD. The dashed line 102 indicates a path of a head of the HDD during rotation about the center O' of the spindle motor.

Further referring to FIG. 1A, the misalignment of the track 100 and the rotational path 102 is referred to as eccentricity of the disk. FIG. 1B illustrates the eccentricity level for one revolution of the disk 12. Referring to FIGS. 1A and 1B, note that at points c and d, the track 100 and the rotational path 102 are aligned for zero eccentricity. At points a and b, the track 100 and the rotational path 102 are most misaligned for a maximum level of eccentricity in opposite directions. Thus, the plot of eccentricity for one revolution of the disk 12 is a sine wave as illustrated in FIG. 1B.

FIG. 1C illustrates tracks and sectors of the disk 12. Tx indicates a track number, and Sy indicates a sector number for each sector. Thus, the disk 12 of FIG. 1C has three tracks with eight sectors in each track for clarity and simplicity of illustration and description. However, a typical disk has more numerous tracks and sectors.

Referring to FIG. 1D, each sector 104 of the disk 12 includes respective servo information 106 and respective data 108. Servo information 106 indicates the identification and location of the sector 104.

Because of the eccentricity of the disk 12 with respect to the spindle motor, the head for reading the servo information is not aligned to the tracks of the disk 12. Such misalignment results in servo time jitter in the servo signal detected by the head from the track of the disc 12. Such servo time jitter refers to change in timing of the servo signal detected by the head from the track of the disc 12. Referring to FIGS. 1A and 1B, the servo time jitter is worst for sectors located near points a and b, and the servo time jitter is least for sectors located near points c and d.

Such servo time jitter needs to be compensated in order to accurately extract the servo information from the servo signal. In the prior art, servo time jitter values are measured and stored in a table for each sector during manufacture of the HDD. During operation of the HDD, each servo time jitter value is read from the table, and the start time of a servo gate pulse corresponding to each sector is adjusted according to the servo time jitter value.

However, the eccentricity (and thus the servo time jitter value) would change from unexpected sources such as an external impact on the HDD. The servo time jitter values stored in the table would not account for such changed eccentricity. In addition, time is needed to measure the servo time jitter value during manufacture of the HDD, and memory capacity is needed for storing the table of the servo time jitter values.

SUMMARY OF THE INVENTION

Accordingly in the present invention, jitter for the servo signal is compensated in real time instead of by using a table of servo time jitter values.

For compensating for jitter within a data storage device in an aspect of the present invention, a jitter amount is determined from timings of servo signals for sectors of the data storage device. A timing of a servo gate pulse is adjusted for accessing another sector depending on the jitter amount. Such a jitter amount depends on the eccentricity of a disc having the sectors within the data storage device.

In one embodiment of the present invention, the servo signals are for two past sectors that have been consecutively accessed. For example, one of the two past sectors has been accessed right after the other of the two past sectors has been accessed. In addition, the servo gate pulse is for a next sector to be accessed right after the two past sectors have been accessed.

In another embodiment of the present invention, for determining the jitter amount, a number of cycles of a clock signal is counted between detection of the two servo signals. In addition, the counted number of cycles of the clock signal is compared to a reference number for determining the jitter amount.

In a further embodiment of the present invention, for adjusting the timing of the servo gate pulse, a start of the servo gate pulse is delayed for a positive jitter amount, and the start of the servo gate pulse is sped up to begin earlier for a negative jitter amount.

In an example embodiment of the present invention, a RRO (repeatable run-out) compensator determines the adjustment of the timing of the servo gate pulse depending on the jitter amount. In that case, the RRO compensator determines the adjustment of the timing of the servo gate pulse when the RRO compensator is not processing a PES (position error signal) within the data storage device.

The present invention may be used to particular advantage when the data storage device is a HDD (hard disc drive). However, the present invention may be practiced with any type of a data storage device having sectors.

In this manner, the jitter amount is determined from accessing two past sectors for determining an adjustment to a servo gate pulse for accessing a next sector. With such real time compensation for the jitter amount, any changes to the jitter amount from unexpected sources such as an external impact on the HDD may be compensated. Furthermore, jitter amounts are not stored for saving memory capacity. In addition, time for manufacturing the HDD is reduced since jitter amount is not measured in advance for every sector.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1A, 1B, 1C, 1D, 2, 3, 4, 5, 6A, 6B, 7, 8, 9, 10, 11, and 12 refer to elements having similar structure and/or function.

DETAILED DESCRIPTION OF THE INVENTION

The present invention is described for a (HDD) hard disk drive as an example data storage device. However, the present invention may be practiced with any type of a data storage device having sectors.

Figure 2:
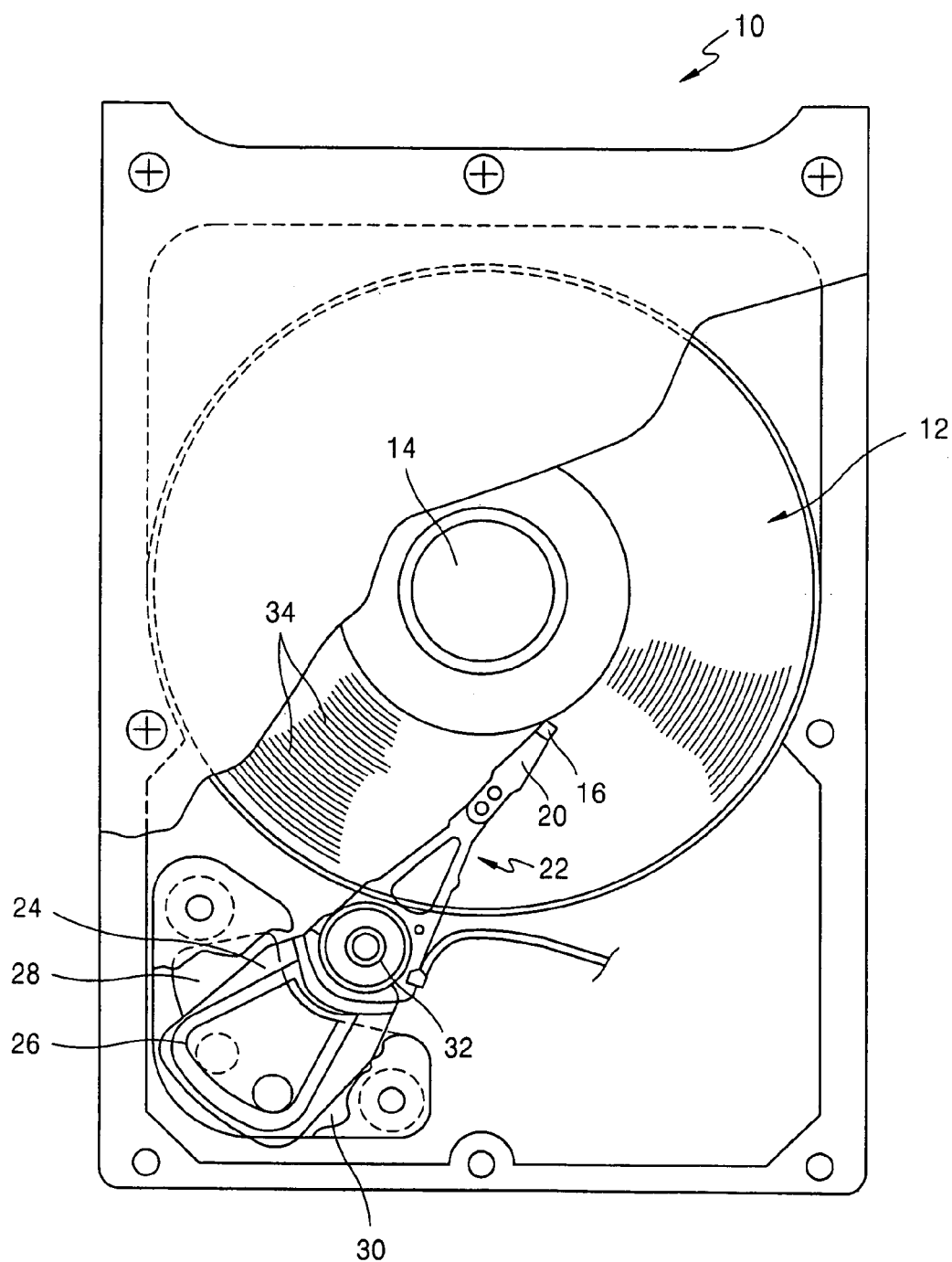
FIG. 2 shows a top view of a disk drive that compensates for servo time jitter, according to an embodiment of the present invention.

A HDD includes a head disk assembly (HDA) including mechanical parts and an electric circuit. FIG. 2 illustrates a HDA 10 of a HDD according to an embodiment of the present invention. The HDA 10 includes at least one magnetic disk 12 rotated by a spindle motor 14, and includes a transducer (not shown) adjacent to the surface of the disk 12.

The transducer reads or writes information from/onto the disk 12 by sensing a magnetic field of the disk 12 or by magnetizing the disk 12. The transducer is disposed near the surface of the disk 12 that is rotated. Although a single transducer is illustrated in FIG. 2, the transducer typically includes a writing transducer that magnetizes the disk 12, and a reading transducer that senses the magnetic field of the disk 12. The reading transducer may be a magneto-resistive (MR) device.

The transducer is typically incorporated into a head 16. The head 16 is constructed to create an air bearing between the transducer and the surface of the disk 12 that is rotating. The head 16 is incorporated into a head stack assembly (HSA) 22 that is attached to an actuator arm 24 including a voice coil 26. The voice coil 26 is adjacent to a magnetic assembly 28 of a voice coil motor 30. Current flowing through the voice coil 26 generates a torque that rotates the actuator arm 24 with respect to a bearing assembly 32. When the actuator arm 24 rotates, the transducer moves across the surface of the disk 12.

Information is stored in annular tracks 34 of the disk 12. Each of the tracks 34 includes a plurality of sectors, and each sector includes a data field and a servo field. The servo field includes servo information such as grey codes that identify the sectors and the tracks (cylinders). A pattern of the servo information in the servo field includes a servo synchronous signal SYNC, servo address/index marks (SAM/SIM), a grey code, and busts A, B, C, and D. The transducer reads or writes information from/onto desired sectors by moving across the surface of the disk 12.

Figure 3:
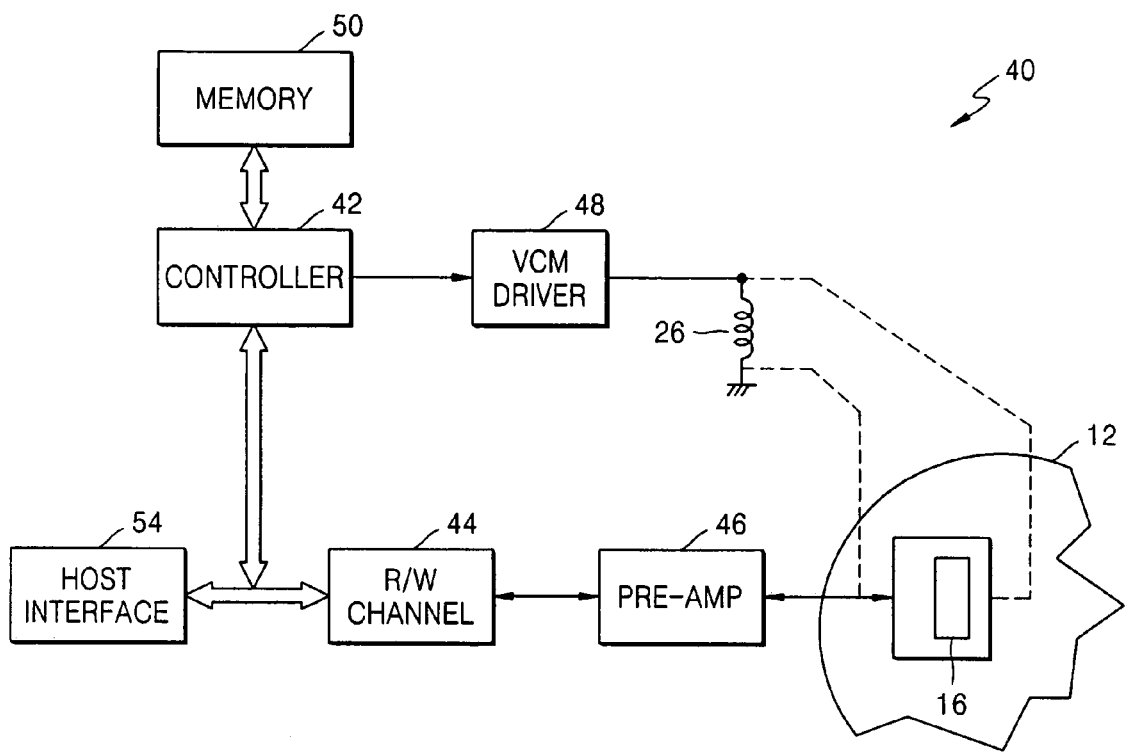
FIG. 3 shows a block diagram of components of the disk drive of FIG. 2, according to an embodiment of the present invention.

FIG. 3 shows an electrical system 40 for controlling operation of the HDD. The electrical system 40 includes a controller 42 coupled to a transducer 16 through a read/write (R/W) channel circuit 44 and a pre-amp circuit 46. The controller 42 may be a digital signal processor, a microprocessor, a micro-controller, or another type of data processing device. The controller 42 transmits a control signal to the R/W channel circuit 44 to read or write information from/onto the disk 12. Generally, information is transmitted from the R/W channel circuit 44 to the host interface circuit 54. The host interface circuit 54 includes a buffer memory and a control circuit for interfacing with a host system such as a PC.

In addition, the controller 42 is connected to a voice coil motor (VCM) driver 48 that supplies current to the voice coil 26. The controller 42 transmits the control signal to the VCM driver 48 to control the VCM and the movement of the transducer 16. The memory 50 stores firmware and control data for controlling the disk drive.

General operation of the HDD is now described. In a data read mode, the disk drive amplifies an analog signal sensed by the transducer 16 (often called a head) from the disk 12 such that the pre-amp 46 easily processes the analog signal. Then, the R/W channel circuit 44 encodes the amplified analog signal into a digital signal readable by the host system (not shown) and converts the digital signal into stream data which is transmitted to the host system via the host interface circuit 54.

In a data write mode, the disk drive receives data from the host system via the host interface circuit 54 and temporarily stores the data in its internal buffer (not shown). The internal buffer sequentially outputs the data, and the R/W channel circuit 44 converts the data into a binary data stream suitable for a write channel. The pre-amp 46 amplifies a recording current corresponding to the binary data stream, which is then written onto the disk 12 via the transducer 16.

Figure 4:
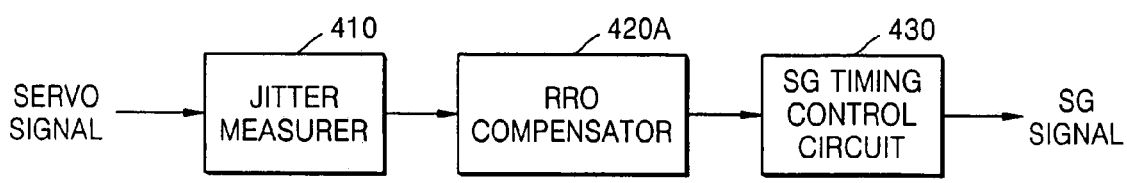
FIG. 4 shows a block diagram of components within a controller in FIG. 3 for compensating for servo time jitter, according to an embodiment of the present invention.

Referring to FIG. 4, the controller 42 includes components that compensate for servo time jitter, according to an embodiment of the present invention. The controller 42 includes a jitter measurer 410, a jitter compensator 420A, and a SG (servo gate) timing control circuit 430. Each of the components 410, 420A, and 430 may be implemented in hard-ware or as software modules. For the software example, the memory 50 includes sequences of instructions that when executed by the controller 42 causes the controller to perform the steps of the flow-chart of FIG. 12. In another embodiment of the present invention, the jitter compensator 420A is also a RRO (repeatable run-out) compensator.

Figure 7:
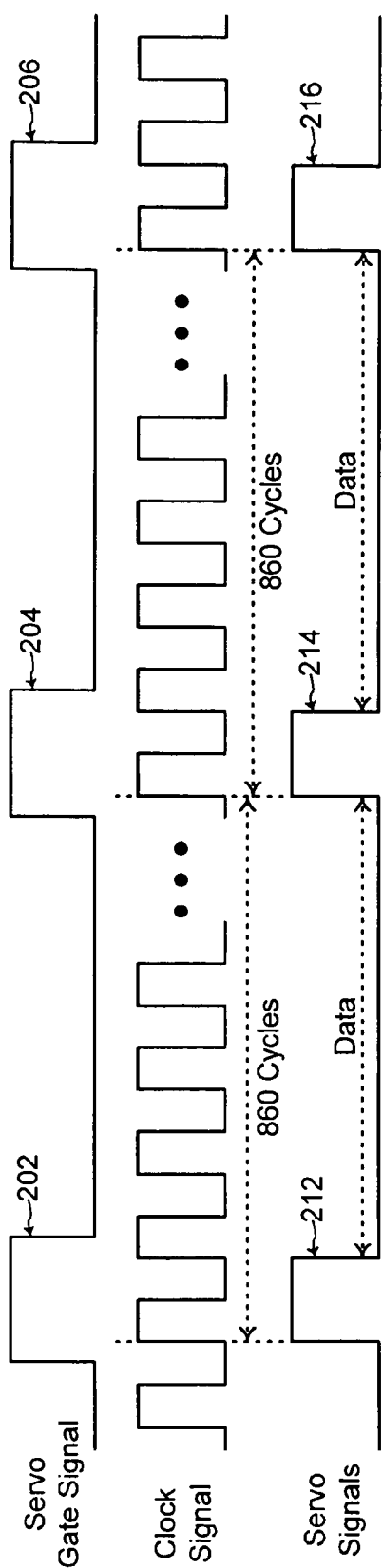
FIG. 7 shows a timing diagram of signals when the servo time jitter amount is negligible.

FIG. 7 shows a timing diagram of a servo gate signal, a clock signal, and servo signals for the ideal case of no servo time jitter. The servo gate signal has a first servo gate pulse 202, a second servo gate pulse 204, and a third servo gate pulse 206. During each servo gate pulse, servo information is extracted from a respective servo signal. Each servo signal is detected for accessing a respective sector on the disk of the HDD.

Thus, a first servo signal is detected during a first time period 212 within the first servo gate pulse 202, a second servo signal is detected during a second time period 214 within the second servo gate pulse 204, and a third servo signal is detected within a third time period 216 within the third servo gate pulse 206. In the ideal case of no servo time jitter, a fixed number of cycles of the clock signal occurs between detection of two consecutive servo signals. In FIG. 7, 860 cycles of the clock signal occurs between detection of each set of two consecutive servo signals. Thus, the timing of the servo gate pulses 202, 204, and 206 is easily controlled such that the servo signals 212, 214, and 216 are within the respective servo gate pulses 202, 204, and 206 in FIG. 7.

Figure 8:
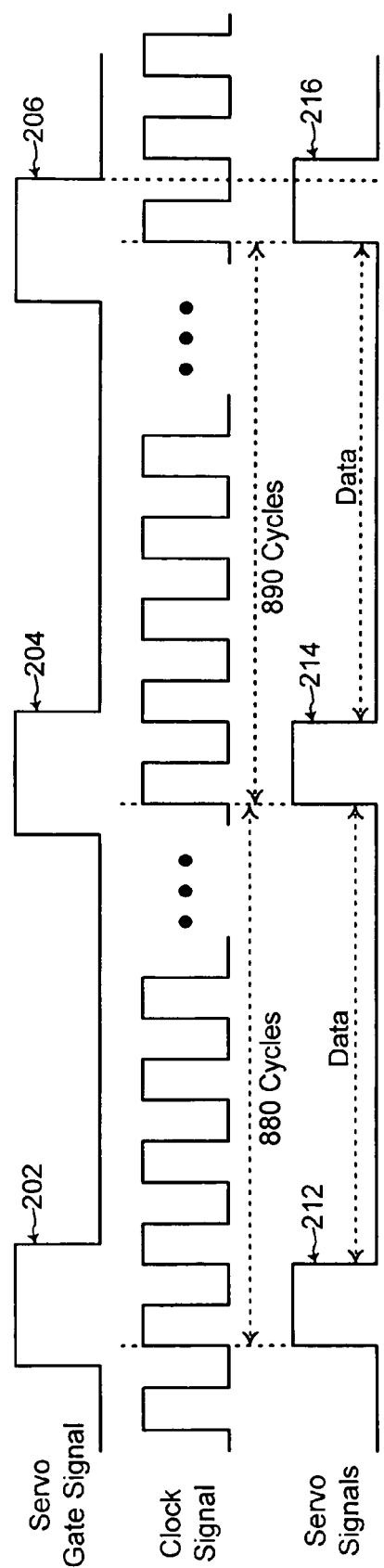
FIG. 8 shows a timing diagram of signals for a positive servo time jitter amount.

FIG. 8 shows a timing diagram of the servo gate signal, the clock signal, and the servo signals for the case of positive servo time jitter. In that case, the number of cycles of the clock signal between detection of two consecutive servo signals is increased from the ideal reference number of 860. Thus, 880 cycles of the clock signal occur between detection of the first and second servo signals 212 and 214, and 890 cycles of the clock signal occur between the detection of the second and third servo signals 214 and 216.

Figure 1A:
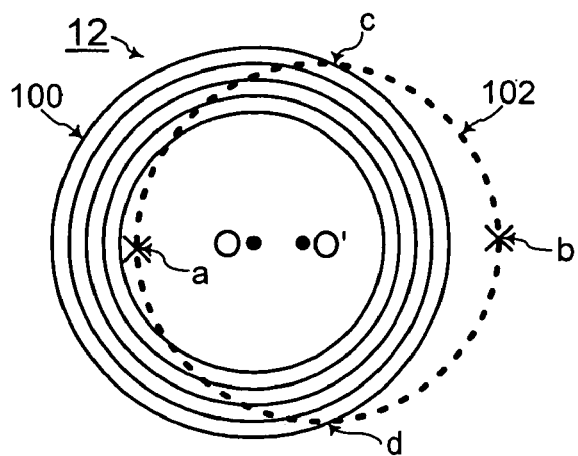
FIG. 1A illustrates eccentricity from misalignment of a center of tracks of a disk with a center of rotation of a spindle motor, according to the prior art.
Figure 1B:
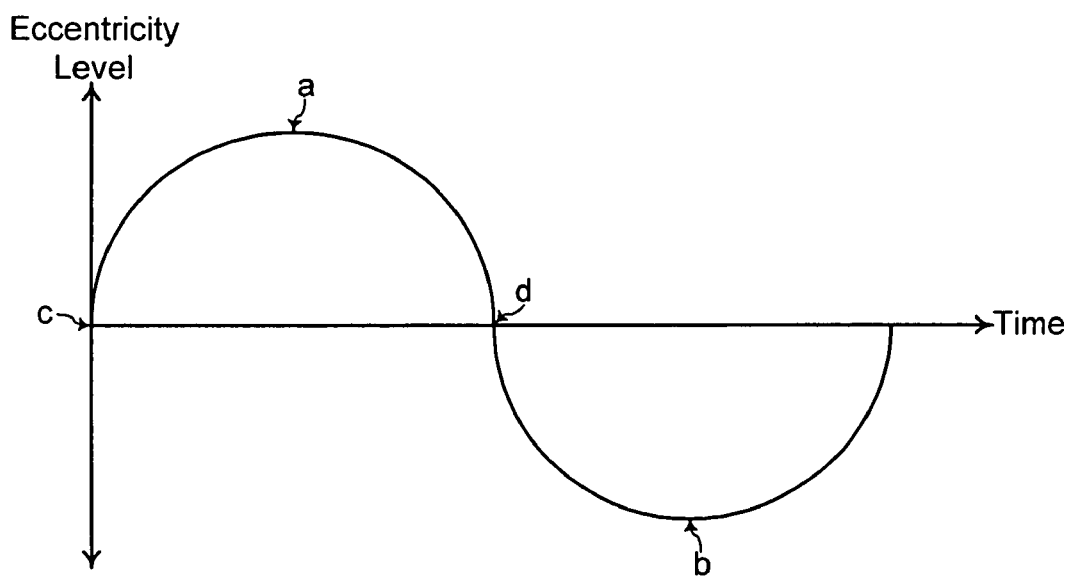
FIG. 1B is a plot of eccentricity level for one revolution of the disk in FIG. 1A, according to the prior art.
Figure 1C:
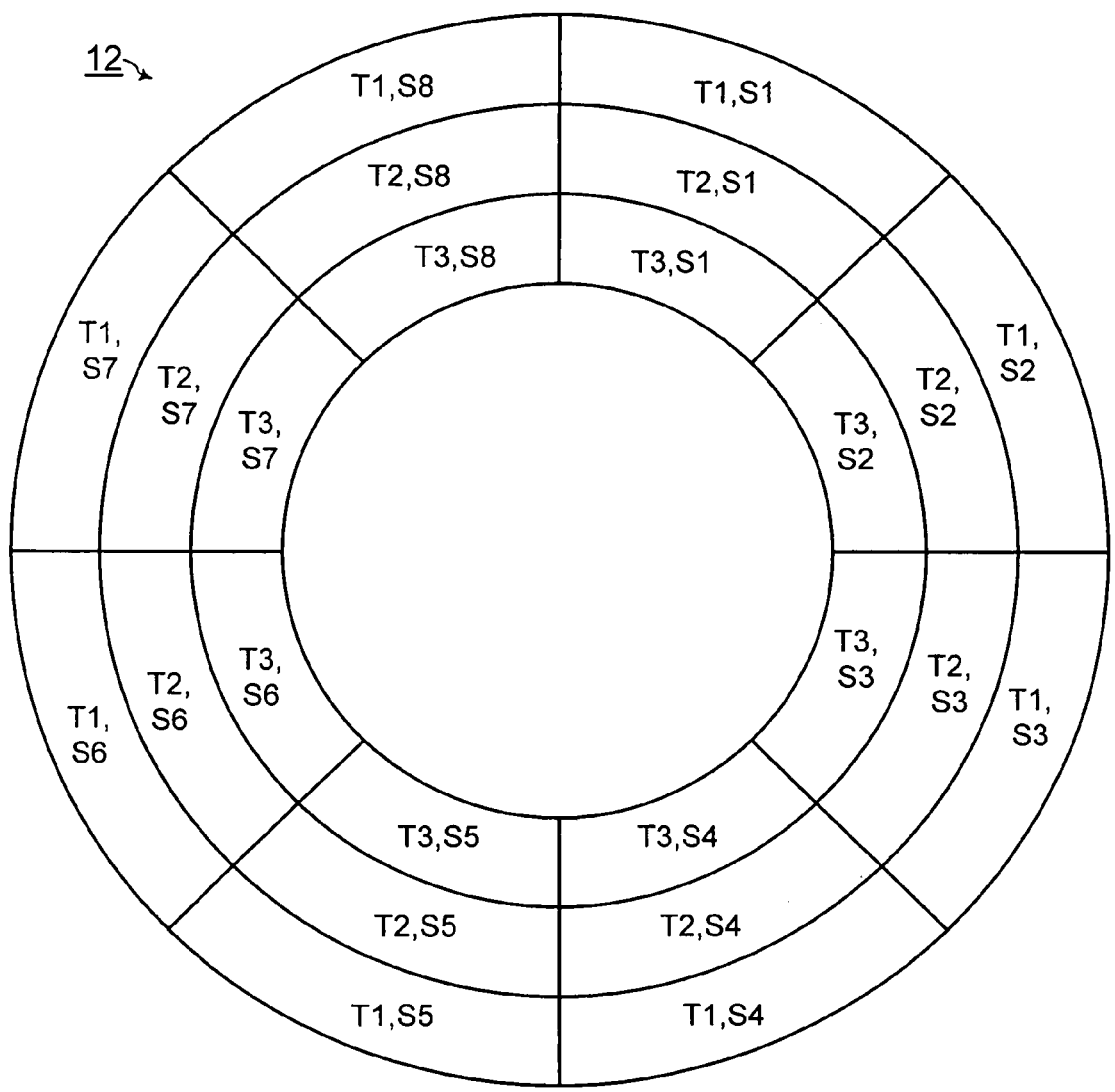
FIG. 1C shows organization of tracks and sectors within a disk, according to the prior art.
Figure 1D:
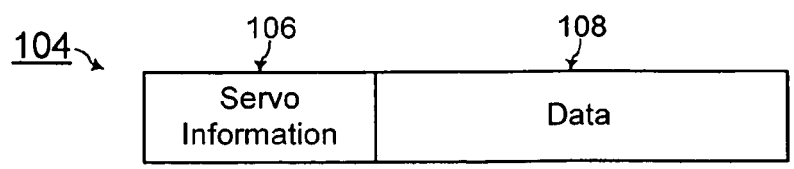
FIG. 1D shows an example sector having servo information and data, according to the prior art.

Such delay of the servo signals 214 and 216 occurs because the corresponding sectors are located near a point of high eccentricity (such as near point b in FIG. 1A). Because of such delay, the servo signals 214 and 216 may not be detected within the respective servo gate pulses 204 and 206.

For example, in FIG. 8, the third servo signal 216 is not completely detected within the third servo gate pulse 206 with a portion of the third servo signal 216 being detected after the third servo gate pulse 206. Thus, a portion of the servo signal 216 may not be properly processed leading to failure of operation within the HDD.

Figure 9:
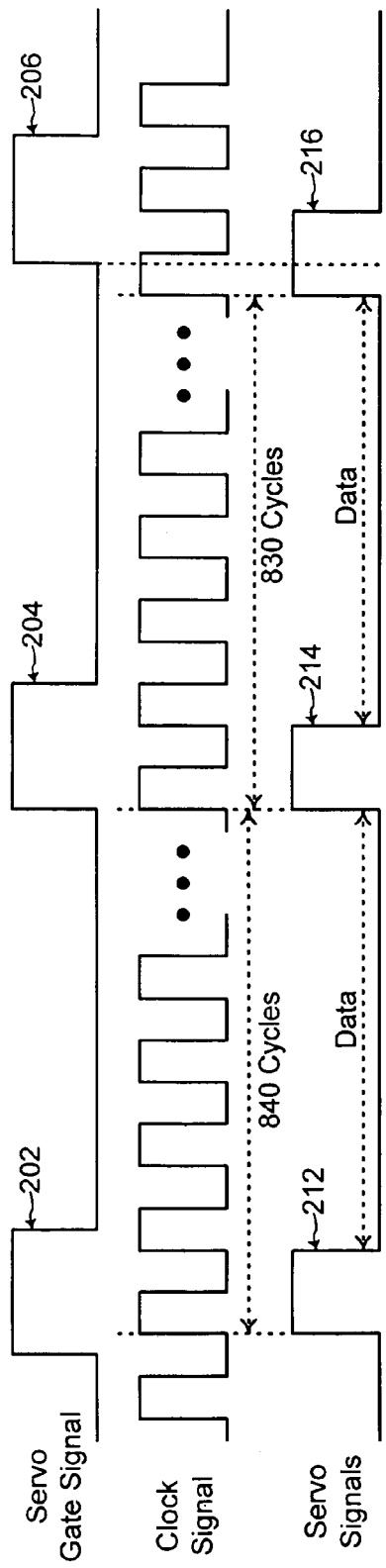
FIG. 9 shows a timing diagram of signals for a negative servo time jitter amount.

FIG. 9 shows a timing diagram of the servo gate signal, the clock signal, and the servo signals for the case of negative servo time jitter. In that case, the number of cycles of the clock signal between detection of two consecutive servo signals is decreased from the ideal reference number of 860. Thus, 840 cycles of the clock signal occur between detection of the first and second servo signals 212 and 214, and 830 cycles of the clock signal occur between the detection of the second and third servo signals 214 and 216.

Such speeding up of the servo signals 214 and 216 occurs because the corresponding sectors are located near a point of high eccentricity (such as near point a in FIG. 1A). Because of such speeding up, the servo signals 214 and 216 may not be detected within the respective servo gate pulses 204 and 206. For example, in FIG. 9, the third servo signal 216 is not completely detected within the third servo gate pulse 206 with a portion of the third servo signal 216 being detected before the third servo gate pulse 206. Thus, a portion of the servo signal 216 may not be properly processed leading to failure of operation within the HDD.

Figure 12:
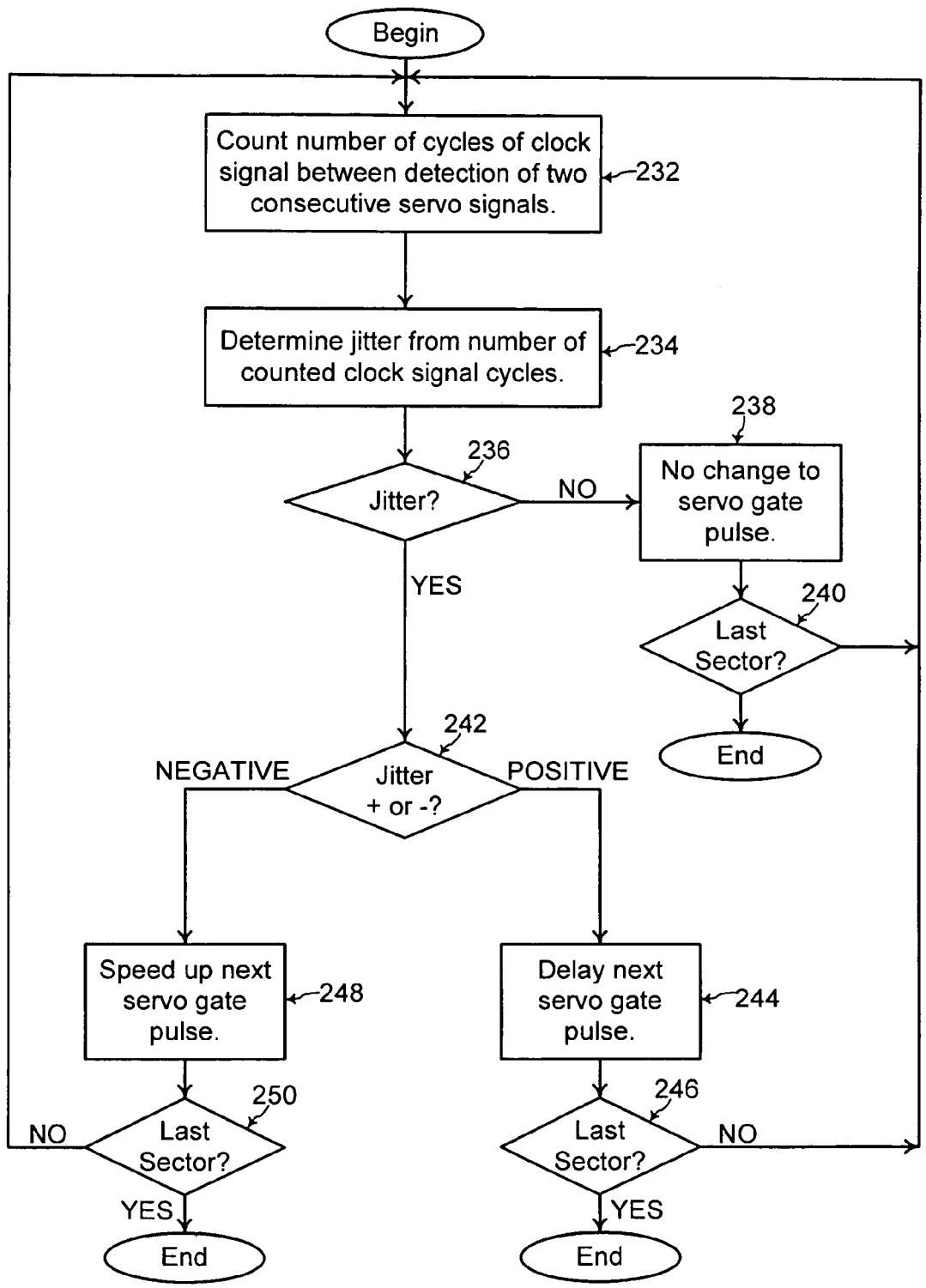
FIG. 12 shows a flow-chart of steps of compensating for servo time jitter, according to an embodiment of the present invention.

The operation of the elements 410, 420A, and 430 of FIG. 4 for compensating for such positive and negative servo time jitters is now described in reference to the timing diagrams of 10 and 11 and the flow-chart of FIG. 12.

Figure 11:
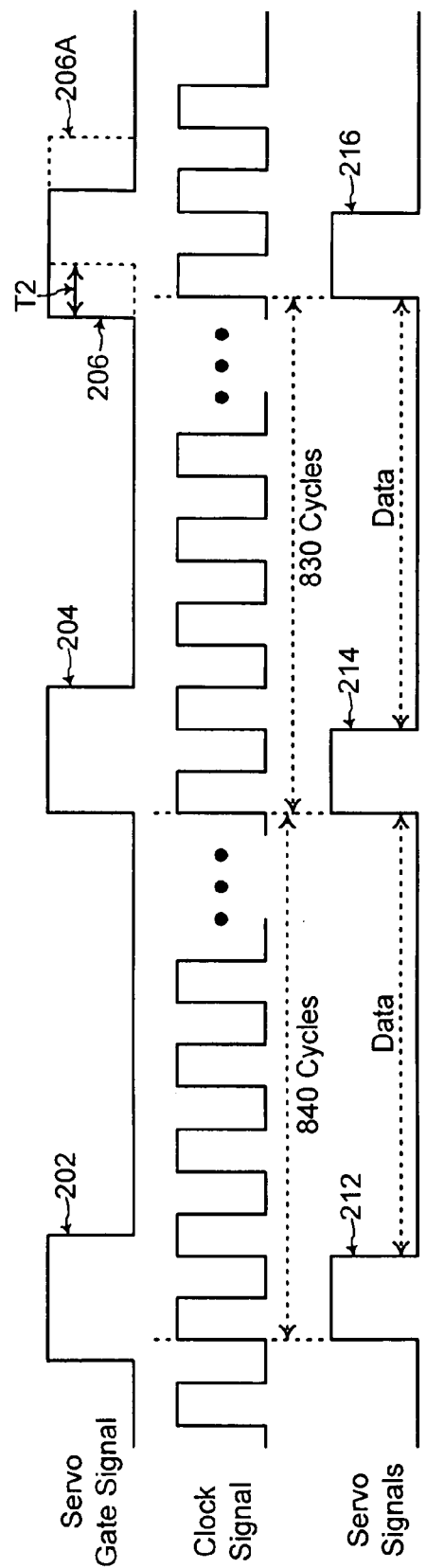
FIG. 11 shows a timing diagram of signals with adjustment of the start time of the servo gate pulse for the negative servo time jitter amount, according to an embodiment of the present invention.

Referring to FIGS. 4 and 11, the jitter measurer 410 determines a jitter amount for the first and second servo signals 212 and 214. The first, second, and third servo signals 212, 214, and 216 are for consecutively accessing first, second, and third sectors, respectively, in the disk 12. Such first, second, and third sectors are disposed along a same track of the disk 12 in one embodiment of the present invention. For determining the jitter amount from the first and second servo signals 212 and 214, the number of cycles of the clock signal is counted between the beginning of detection of the first servo signal 212 to the beginning of the detection of the second servo signal 214 (step 232 of FIG. 12).

Figure 10:
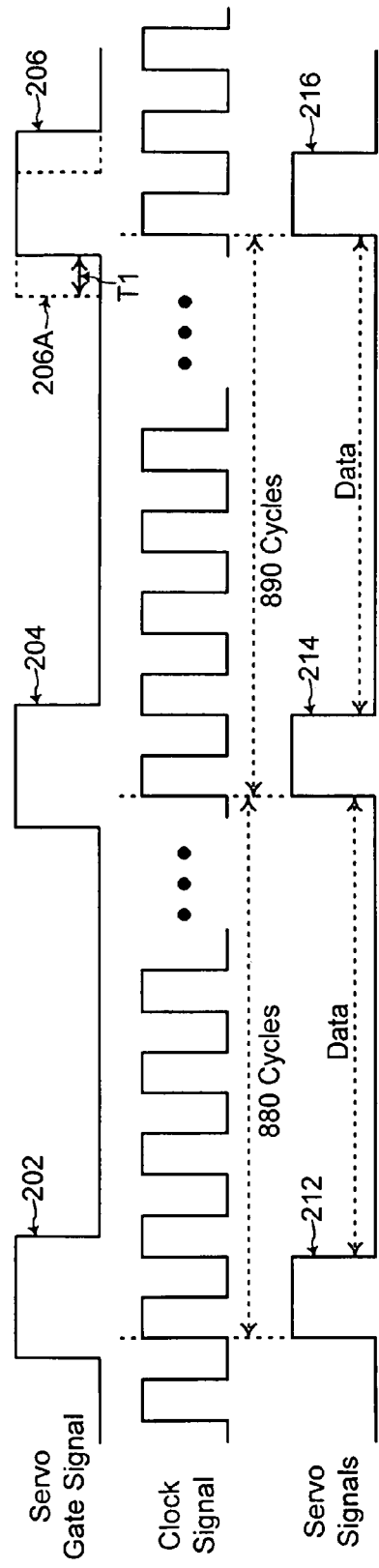
FIG. 10 shows a timing diagram of signals with adjustment of a start time of a servo gate pulse for the positive servo time jitter amount, according to an embodiment of the present invention.

FIG. 10 shows a timing diagram of the servo gate signal, the clock signal, and the servo signals for the case of compensating for positive servo time jitter. In the case of FIG. 10, 880 cycles of the clock signal are counted between detection of the first and second servo signals 212 and 214.

In addition for determining the jitter amount, the counted cycles of the clock signal is compared to a reference number (step 234 of FIG. 12). The reference number is for the ideal case of no jitter (i.e., 860 cycles in FIG. 7). The reference number subtracted from the counted cycles of the clock signal indicates the jitter amount (880−860=+20 in the case of FIGS. 7 and 10).

The jitter compensator 420A determines that jitter is present if the jitter amount is not equal to zero (step 236 of FIG. 12). If the jitter amount is zero (as for the case of FIG. 7), then the next servo pulse (i.e., the third servo pulse 206) for the next servo to be accessed (i.e., for the third servo signal 216) is not adjusted (step 238 of FIG. 12).

Thereafter, the controller 42 checks whether the second servo signal 214 is for a last sector to be accessed (step 240 of FIG. 12). If the second servo signal 214 is for a last sector to be accessed, the flow-chart of FIG. 12 ends. Otherwise, the flow-chart of FIG. 12 loops back to step 232 for determining the jitter between the second and third servo signals 214 and 216 for potentially adjusting a fourth servo gate pulse (not shown in FIG. 7) after the third servo gate pulse 206.

If jitter is present with a non-zero jitter amount in step 236, the jitter compensator 420A determines whether the jitter amount is positive or negative (step 242 of FIG. 12). Consider the case of a positive jitter amount in FIG. 10. In that case, the jitter compensator 420A controls the SG (servo gate) timing control circuit 430 to generate the next (i.e., the third) servo gate pulse 206 with a delay time period T1 (step 244 of FIG. 12).

Thus, the start of the third servo gate pulse 206 is delayed by the delay time period T1 from the case of the non-adjusted third servo gate pulse 206A (as shown with dashed lines 206A in FIG. 10). With such a delay T1 to the start of the third servo gate pulse 206, the third servo gate signal 216 is all detected within the third servo gate pulse 206 in FIG. 10. The duration of the delay T1 is proportional to the positive jitter amount in one embodiment of the present invention.

Thereafter, the controller 42 checks whether the second servo signal 214 is for a last sector to be accessed (step 246 of FIG. 12). If the second servo signal 214 is for a last sector to be accessed, the flow-chart of FIG. 12 ends. Otherwise, the flow-chart of FIG. 12 loops back to step 232 for determining the jitter between the second and third servo signals 214 and 216 for potentially adjusting a fourth servo gate pulse (not shown in FIG. 10) after the third servo gate pulse 206.

Consider the case of a negative jitter amount in FIG. 11. The jitter amount is –20 between the first and second servo signals 212 and 214 in FIG. 11. In that case, the jitter compensator 420A controls the SG (servo gate) timing control circuit 430 to generate the next (i.e., the third) servo gate pulse 206 with a sped up time period T2 (step 248 of FIG. 12).

Thus, the start of the third servo gate pulse 206 is sped up by the time period T2 from the case of the non-adjusted third servo gate pulse 206A (as shown with the dashed lines 206A in FIG. 11). With such speeding up by time period T2 to the start of the third servo gate pulse 206, the third servo gate signal 216 is all detected within the third servo gate pulse 206 in FIG. 11. The duration of the time period T2 is proportional to the magnitude of the negative jitter amount in one embodiment of the present invention.

Thereafter, the controller 42 checks whether the second servo signal 214 is for a last sector to be accessed (step 250 of FIG. 12). If the second servo signal 214 is for a last sector to be accessed, the flow-chart of FIG. 12 ends. Otherwise, the flow-chart of FIG. 12 loops back to step 232 for determining the jitter between the second and third servo signals 214 and 216 for potentially adjusting a fourth servo gate pulse (not shown in FIG. 11) after the third servo gate pulse 206.

In this manner, the positive or negative servo time jitter is compensated in real time by adjusting the starting time of the next servo gate pulse. In such real time compensation, the jitter amount is determined from consecutive access of two past sectors for determining an adjustment to the servo gate pulse for accessing a next sector. With such real time compensation, any changes to the jitter amount from unexpected sources such as an external impact on the HDD may be compensated. Furthermore, jitter amounts are not stored for saving memory capacity. In addition, time for manufacturing the HDD is reduced since jitter amount is not measured in advance for every sector.

Figure 5:
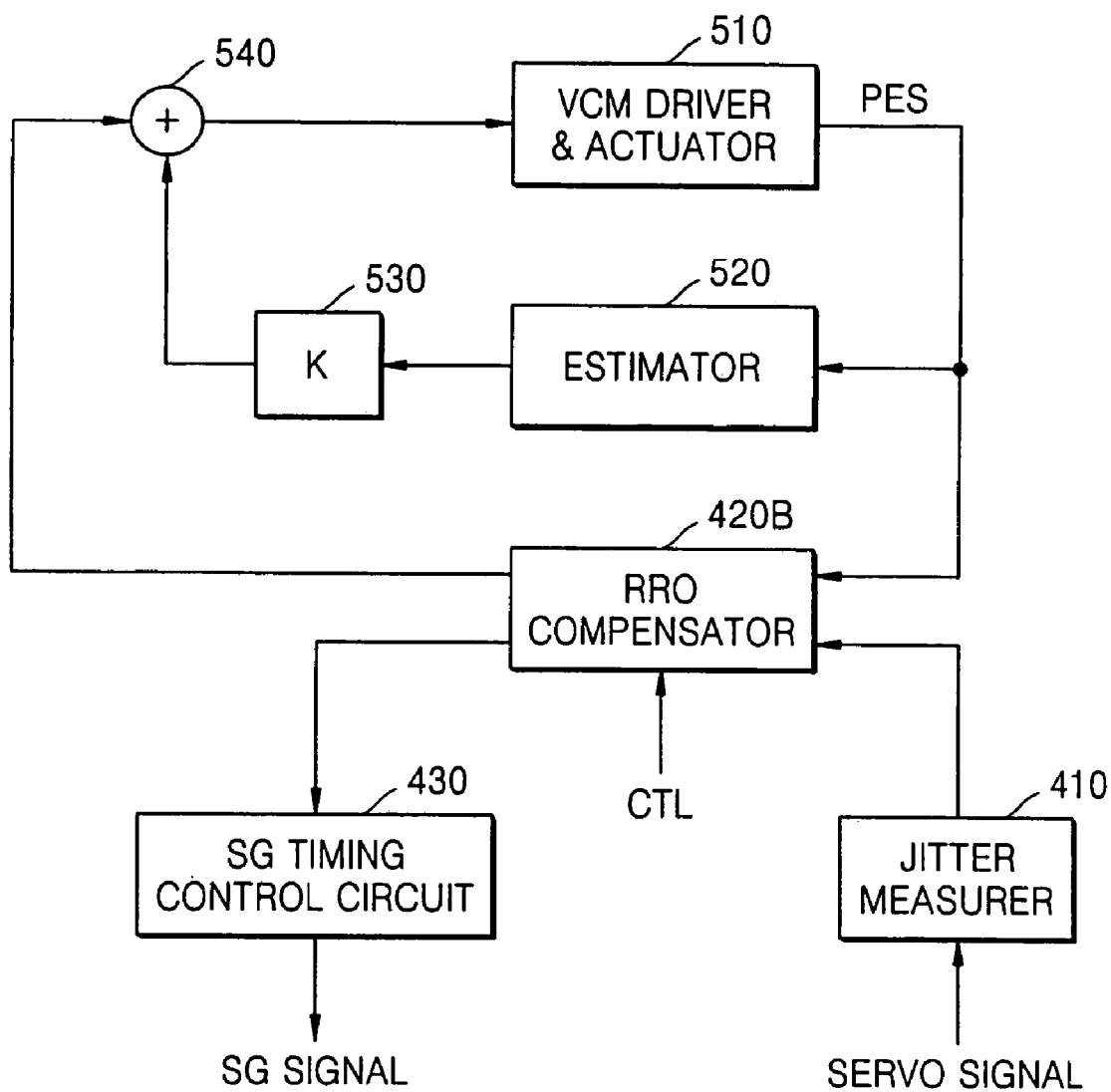
FIG. 5 shows a block diagram with additional components from FIG. 4 within the disk drive, according to an embodiment of the present invention.

FIG. 5 shows a block diagram of a HDD including a jitter compensator that is also part of a RRO (repeatable run out) compensator. Referring to FIG. 5, the disk drive includes a jitter measurer 410, an RRO compensator 420B, an SG timing control circuit 430, a VCM driver and actuator 510, an estimator 520, a feedback control circuit 530, and a summing unit 540.

The jitter measurer 410, the RRO compensator 420B, and the SG timing control circuit 430 are similar to the elements 410, 420A, and 430, respectively, as described above with reference to FIG. 4. Thus, the RRO compensator 420B adjusts the start time of a next servo gate pulse depending on the jitter amount determined from two past consecutive servo signals, similarly as already described for the element 420A.

In addition, the RRO compensator 420B also processes the PES (position error signal) for compensation of repeatable run out error as described for example in U.S. Pat. No. 6,377,417 or U.S. Pat. No. 6,437,936. In one embodiment of the present invention, a control signal CTL is used for controlling the RRO compensator 420B to operate between one of first or second modes. In a first mode, the RRO compensator 420B operates to determine the adjustment to the next servo gate pulse for compensating for servo time jitter. In a second mode, the RRO compensator 420B operates to process the PES (position error signal).

The estimator 520 calculates estimated and measured values of the position and velocity of a head using a state equation, and generates a position error value and a speed error value equivalent to the difference between the estimated and measured values of the position and the speed of the head. The feedback control circuit 530 multiplies each of the position error value and the velocity error value by a gain constant, adds a bias value, and outputs the result to the summing unit 540. The summing unit 540 transmits an actuator driving signal obtained by adding a value output from the feedback control circuit 530 and the RRO compensation value of the position error signal generated by the RRO compensator 420B to the VCM driver & actuator 510.

Figure 6A:
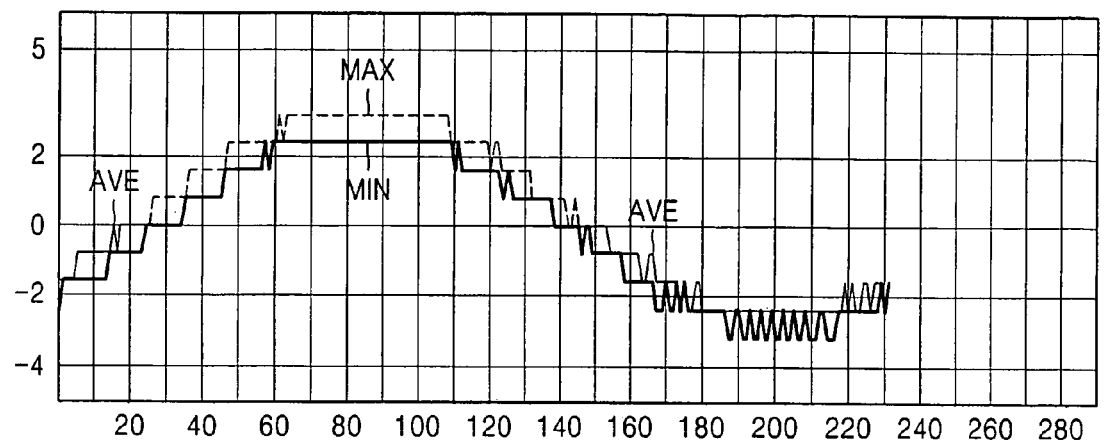
FIG. 6A is a plot of jitter amount with respect to a servo gate pulse before adjustment of a start time of the servo gate pulse.
Figure 6B:
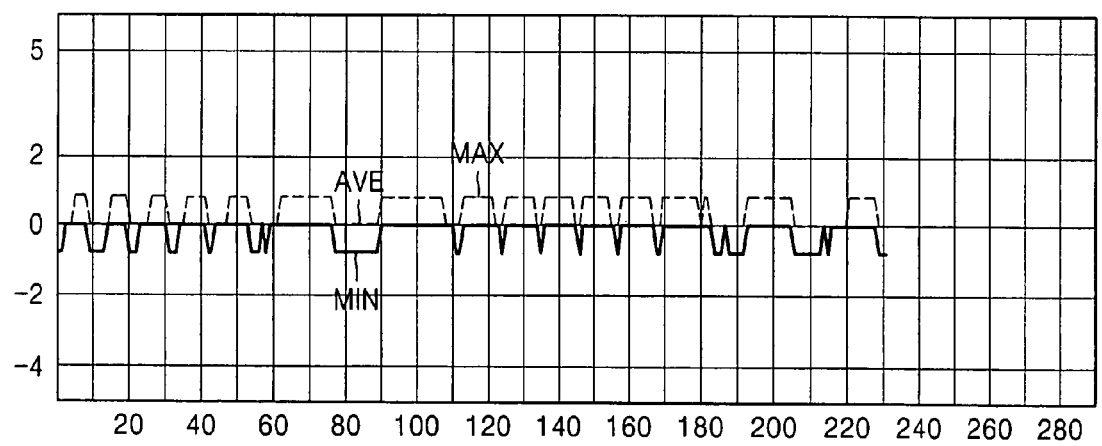
FIG. 6B is a plot of jitter amount with respect to the servo gate pulse after adjustment of a start time of the servo gate pulse.

FIG. 6A is a plot of jitter amount with respect to a servo gate pulse before adjustment of a start time of the servo gate pulse. FIG. 6B is a plot of jitter amount with respect to the servo gate pulse after adjustment of a start time of the servo gate pulse, according to the present invention. FIG. 6B illustrates that the jitter amount is substantially minimized with the present invention.

While the present invention has been particularly shown and described with reference to exemplary embodiments thereof, it will be understood by those of ordinary skill in the art that various changes in form and details may be made therein without departing from the spirit and scope of the present invention as defined by the following claims.

Thus, the foregoing is by way of example only and is not intended to be limiting. For example, the present invention is described for a (HDD) hard disk drive as an example data storage device. However, the present invention may be practiced with any type of a data storage device having sectors. In addition, any numbers of elements illustrated and described herein are by way of example only.

The present invention is limited only as defined in the following claims and equivalents thereof.

What is claimed is:

1. A method of compensating for jitter within a data storage device, comprising:

determining a jitter amount from timings of servo signals for sectors of the data storage device; and adjusting a timing of a servo gate pulse for accessing another sector, wherein the timing of the servo gate pulse is delayed, sped up, or unchanged depending on the jitter amount.

2. The method of claim 1, wherein the jitter amount depends on the eccentricity of a disc having the sectors within the data storage device.

3. The method of claim 1, wherein the servo signals are for two past sectors that have been sequentially accessed.

4. The method of claim 3, wherein one of the two past sectors has been accessed right after the other of the two past sectors has been accessed.

5. The method of claim 3, wherein the servo gate pulse is for a next sector to be accessed right after the two past sectors have been accessed.

6. The method of claim 1, wherein determining the jitter amount includes the steps of:
counting a number of cycles of a clock signal between detection of the two servo signals; and
comparing the counted number of cycles of the clock signal to a reference number for determining the jitter amount.

7. The method of claim 6, wherein adjusting the timing of the servo gate pulse includes the steps of:
delaying a start of the servo gate pulse for a positive jitter amount;
speeding up the start of the servo gate pulse to begin earlier for a negative jitter amount; and
maintaining the timing of the servo gate pulse when the jitter amount is insignificant.

8. The method of claim 1, wherein a RRO (repeatable run-out) compensator determines the adjustment of the timing of the servo gate pulse depending on the jitter amount.

9. The method of claim 8, wherein the RRO compensator determines the adjustment of the timing of the servo gate pulse when the RRO compensator is not processing a PES (position error signal) within the data storage device.

10. The method of claim 1, wherein the data storage device is a HDD (hard disc drive).

11. A data storage device, comprising:
a jitter measurer for determining a jitter amount from timings of servo signals for sectors of the data storage device; and
a compensator for adjusting a timing of a servo gate pulse for accessing another sectors, wherein the compensator adjusts the timing of the servo gate pulse to be delayed, sped up, or unchanged depending on the jitter amount.

12. The data storage device of claim 11, wherein the jitter amount depends on the eccentricity of a disc having the sectors within the data storage device.

13. The data storage device of claim 11, wherein the servo signals are for two past sectors that have been sequentially accessed.

14. The data storage device of claim 13, wherein one of the two past sectors has been accessed right after the other of the two past sectors has been accessed.

15. The data storage device of claim 13, wherein the servo gate pulse is for a next sector to be accessed right after the two past sectors have been accessed.

16. The data storage device of claim 11, wherein jitter measurer counts a number of cycles of a clock signal between detection of the two servo signals, and wherein the jitter measurer compares the counted number of cycles of the clock signal to a reference number for determining the jitter amount.

17. The data storage device of claim 16, wherein the compensator controls a servo gate timing control circuit to delay a start of the servo gate pulse for a positive jitter amount, to speed up the start of the servo gate pulse to be earlier for a negative jitter amount, and to maintain the timing of the servo gate pulse when the jitter amount is insignificant.

18. The data storage device of claim 11, wherein the compensator is a RRO (repeatable run-out) compensator.

19. The data storage device of claim 18, wherein the RRO compensator determines the adjustment of the timing of the servo gate pulse when the RRO compensator is not processing a PBS (position error signal) within the data storage device.

20. The data storage device of claim 11, wherein the data storage device is a HDD (hard disc drive), and wherein the jitter measurer and the compensator are within a controller of the HDD.

* * * * *